Dec. 27, 1966        A. CHANTLAND        3,294,218
BELT CARRIER
Filed Aug. 19, 1964
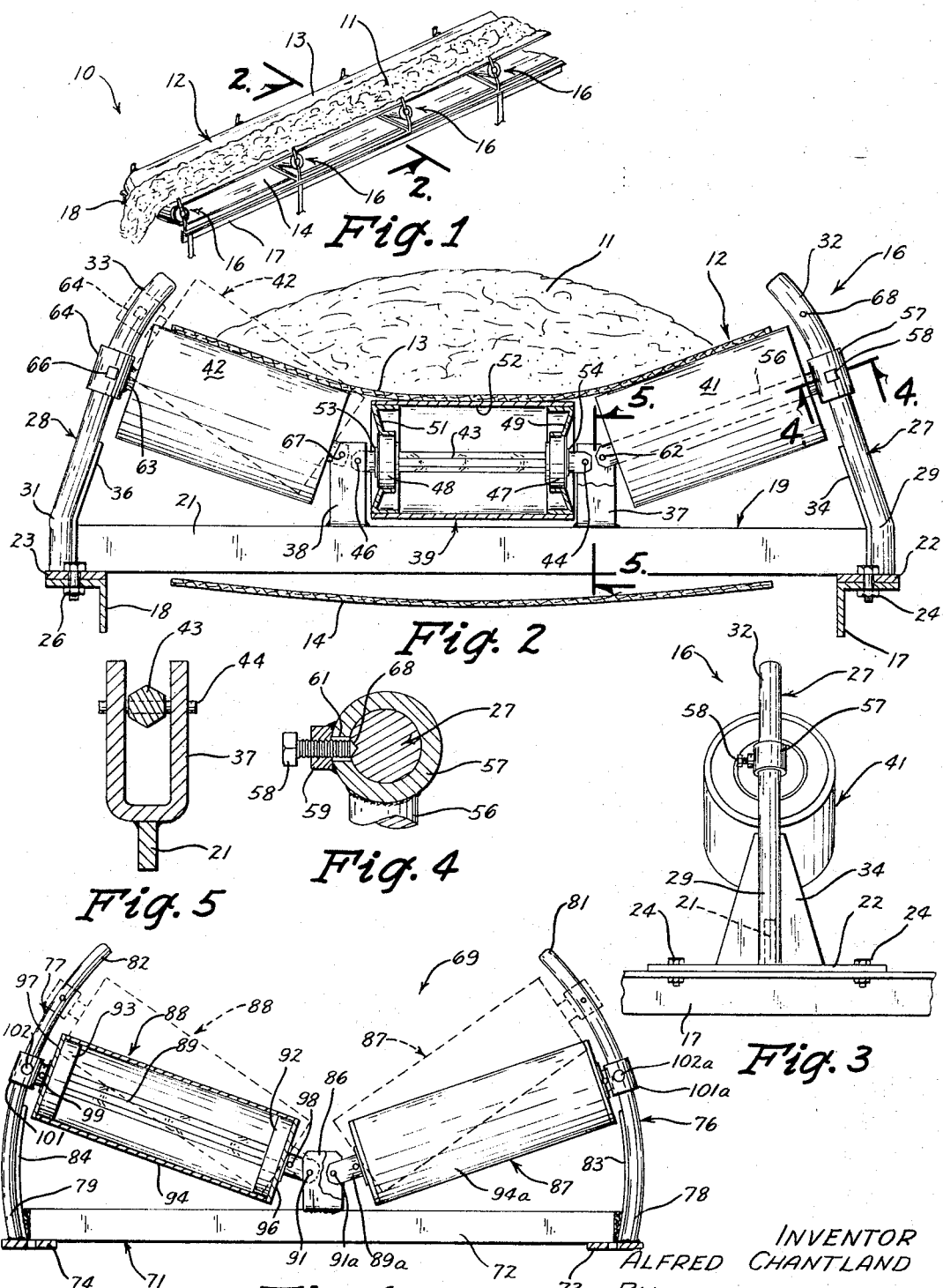
INVENTOR
ALFRED CHANTLAND
BY Rudolph L. Lowell
ATTORNEY

United States Patent Office 3,294,218
Patented Dec. 27, 1966

3,294,218
BELT CARRIER
Alfred Chantland, Humboldt, Iowa 50548
Filed Aug. 19, 1964, Ser. No. 390,599
4 Claims. (Cl. 198—192)

This invention relates to a conveyer assembly having a moving belt supported on a plurality of belt carriers. More particularly, the invention is characterized by a novel belt carrier for supporting and contouring the upper run of a belt.

It is the object of this invention to provide an improved belt carrier.

Another object of the invention is to provide for a run of a belt carrier which is adjustable to vary the transverse contour of the belt.

A further object of the invention is to provide a belt carrier which has a minimum number of parts and is readily serviced and repaired.

Another object of the invention is to provide for a run of a belt carrier which is adjustable to maintain the belt in a curved position for holding a maximum amount of material.

An additional object of the invention is to provide a belt carrier which is simple and sturdy in construction, readily installed in a practical manner, and reliable and efficient in use.

The exact nature of the invention as well as other objects and advantages thereof will be readily apparent from the consideration of the following specification and the accompanying drawing wherein:

FIG. 1 is a fragmentary perspective view of a conveyer assembly equipped with a plurality of belt carriers of this invention;

FIG. 2 is an enlarged sectional view taken along the line 2—2 of FIG. 1 showing the belt carrier of this invention with certain parts broken away;

FIG. 3 is an end elevational view of the belt carrier of FIG. 2;

FIG. 4 is an enlarged sectional view taken along the line 4—4 of FIG. 2;

FIG. 5 is an enlarged sectional view taken along the line 5—5 of FIG. 2; and

FIG. 6 is a front elevational view of a modification of the belt carrier shown in FIG. 2.

Referring to the drawing, there is shown in FIG. 1, a conveyer assembly indicated generally at 10 for transporting bulk material 11 such as grain, sand and similar materials. The conveyer assembly 10 comprises an endless belt 12 having a top run 13 and a bottom run 14. The belt 12 is trained about a series of aligned and substantially identical belt carriers 16, each of which is supported on and secured to a pair of substantially parallel beams 17 and 18.

Referring to FIG. 2, there is shown a belt carrier 16 supporting the upper run 13 of the endless belt 12. The belt carrier 16 comprises a transverse frame 19 having an upright cross bar 21 secured at opposite ends to horizontal plates 22 and 23. Bolt and nut assemblies 24 and 26 secure the plates 22 and 23 to the beams 17 and 18, respectively. Positioned adjacent the opposite ends of the cross bar 21 are a pair of upright posts 27 and 28 having their lower ends 29 and 31, respectively, secured by welds or the like to the tops of the plates 22 and 23 and to the ends of the cross bar 21. From their lower ends 29 and 31 the posts 27 and 28 converge upwardly and terminate in inwardly curved upper ends 32 and 33, respectively. Tapered gusset plates 34 and 36 (FIG. 3) are secured to the inside surfaces of the posts 27 and 28 and to the tops of the plates 22 and 23, respectively, and function to reinforce the posts 27 and 28.

As shown in FIG. 2, a pair of transversely spaced upright yoke members 37 and 38 are secured to the top of the cross bar 21. The yoke members 37 and 38 (FIG. 5) have a generally U-shape which open upwardly. Interposed between the U-shaped yoke members 37 and 38 is a center roller indicated generally at 39 for supporting the center section of the upper run 13 of the belt 12. The center roller 39 may be a plurality of rollers to increase the width of the belt carrier 16. The side rollers indicated generally at 41 and 42 are pivotally mounted on the yoke members 37 and 38, respectively, and support the opposite sections of the upper belt run 13. Each side roller 41 and 42 is adjustably secured to the adjacent upright posts 27 and 28. The rollers 39, 41 and 42 are in alignment transversely of the belt 12 and engage the bottom surface of the top belt run 13 to support the belt and the bulk material carried thereby.

The center roller 39 has a longitudinal center shaft or axle 43 which is pivotally secured at its opposite ends by pins 44 and 46 to the yoke members 37 and 38, respectively. As shown in FIG. 5, the pin 44 projects through the upright legs of the yoke member 37 and the shaft 43 to pivotally attach the shaft to the yoke member. The pin 46 is secured in a like manner to the yoke member 38. The end sections of the shaft 43 carry bearings 47 and 48 which are mounted in channel-shaped annular members 49 and 51. A cylindrical sleeve 52 is secured to the outer peripheral surfaces to the channel-shaped members 49 and 51 to form a rotatable cylinder which is engageable with the belt 12. Snap rings 53 and 54 are seated in suitable grooves in the opposite ends of the shaft 43 and function to maintain the bearings 47 and 48 against longitudinal movement relative to the shaft 43.

The side roller 41 has a center shaft 56 which is secured at its outer end to a collar 57 positioned about the upright post 27. As shown in FIG. 4, a set screw 58 is threaded into a nut 59 secured to the side of the collar 57. The nut 59 is in alignment with a hole 61 in the collar 57 so as to permit the forward end of the set screw 58 to be moved into direct bearing engagement with the post 27. The inner or opposite end of the shaft 56 is pivotally connected by a pin 62 to the upright yoke member 37 at a spaced position upwardly from the pin 44. The pin 62 projects through the upright legs of the yoke member 37 and the shaft 56 in the same manner shown for the pin 44 in FIG. 5.

The side roller 42 has a center shaft 63 secured at its outer end to a collar 64 mounted about the upright post 28. A set screw 66 threadably mounted on the collar 64 secures the collar in an adjusted position on the post 28. The opposite end of the shaft is pivotally connected by a pin 67 to the yoke member 38.

The upright posts 27 and 28 have a plurality of recesses 68, one of which is shown in FIG. 2, for receiving the forward ends of the set screws 58 and 66. The recesses 68 provide indexed positions for changing the angular relationship of the side rollers 41 and 42 with respect to the center roller 39. In practice, the recesses 68 are spaced from each other so that the side rollers 41 and 42 may be positioned at angles of twenty degrees or thirty-five degrees relative to the axis of rotation of the center roller 39.

In order to have a minimum of lost motion or play between the collars 57 and 64 and the posts 27 and 28, the radius of curvature of each of the upper end sections 32 and 33 of the posts substantially coincides with a radius having its center about the pivot pins 62 and 67, respectively.

In use as shown in FIGS. 1 and 2 the rollers 39, 41 and 42 of a carrier 16 support the top run 13 of the belt 12. The bottom run 14 is positioned under the cross bar 21 between the beams 17 and 18. As shown in FIG. 2, the center roller 39 rotates about a horizontal axis substantially parallel to the cross bar 21. The side rollers 41 and 42 rotate about axes which project upwardly and outwardly from the axis of the center roller 39. Thus, the side rollers 41 and 42 are angularly disposed with respect to the center roller 39 and diverge outwardly to provide the belt with a concavely curved transverse cross section to form a shallow trough or channel for receiving bulk material 11.

The cross sectional contour of the belt 12 may be changed by adjusting the angular positions of the side rollers 41 and 42. This is accomplished by releasing the set screws 58 and 66 and moving the collars 57 and 64 on the upright posts 27 and 28. The rollers 41 and 42 are held in their adjusted positions by the coaction of the set screws 58 and 66 with the recesses 68.

A modified form of the belt carrier of this invention, show in FIG. 6, is indicated generally at 69. This carrier is operable to support and contour the upper run of a belt in a manner similar to the function of the belt carriers 16 shown in FIGS. 1 and 2. The carrier 69 comprises a frame 71 having an upright transverse cross bar 72 secured at its opposite ends to plates 73 and 74. Curved upright posts 76 and 77 project from the opposite ends of the cross bar 72. The posts 76 and 77 curve inwardly toward each other and have lower ends 78 and 79 secured by means of welds or the like to the top of the plates 73 and 74 and to the opposite ends of the cross bar 72. From the lower ends 78 and 79 the posts 76 and 77 project upwardly in the plane of the cross bar 72 and terminate in curved end sections 81 and 82. Gusset plates 83 and 84 are secured to the inside surfaces of the posts 76 and 77 and to the top plates 73 and 74 to structurally reinforce the posts.

Secured to the top of the center section of the cross bar 72 is an upright yoke member 86 of a U-shape which is similar to the yoke member 37 shown in FIG. 5.

Interposed between the upright posts 76 and 77 are a pair of substantially identical rollers indicated generally at 87 and 88. The following detailed description is limited to the roller 88 with corresponding parts of roller 87 being identified with like reference numbers having the suffix *a*.

The roller 88 has a central shaft 89 which is pivotally connected at its inner end by a pin 91 to the yoke member 86. Bearings 92 and 93 are rotatably mounted adjacent the opposite ends of the shaft 89 and carry a cylindrical sleeve 94. Circular end plates 96 and 97 are secured to the opposite ends of the sleeve 94 and enclose the bearings 92 and 93 within the sleeve 94. Pins 98 and 99 project transversely through the shaft 89 adjacent the outer sides of the plates 96 and 97 to maintain roller 88 in assembled relation on the shaft 89.

Secured to the outer end of the shaft 89 is a collar 101 which is positioned about the post 77. A set screw 102 threadably engaged with the collar 101 is movable into bearing engagement with the post 77 to hold the roller 88 in an adjusted angular position on the post 77. The collar 101 and set screw 102 is substantially identical to the collar 57 and set screw 58 shown in FIG. 4.

As shown in broken lines the rollers 87 and 88 are adjustably movable about the pins 91 and 91*a*. During this adjustable movement the collars 102 and 102*a* slide along the curved upper end sections 81 and 82 of the posts 76 and 77, respectively. In order to minimize the frictional resistance of the movement of the collars 102 and 102*a* on the posts 76 and 77 the curvature of the upper end of each post 81 and 82 has a radius which substantially coincides with the axes of the pins 91 and 91*a*, respectively. In other words, the radial axes of the curved upper ends 81 and 82 of the posts intersect the yoke member 86.

Where the conveyer assembly is used out-of-doors the belt 12 may have a tendency to be blown from the rollers by strong winds. In such instances the upper end sections of the posts 27 and 28 and 76 and 77 may be projected inwardly toward each other so as to form an enclosing arch unit extended transversely of the conveyer assembly and over the top run 13 of the belt.

In summary, the conveyer assembly 10 has a plurality of substantially identical belt carriers 16 which function to support the upper run of a belt so as to have a concave transverse contour forming a channel or trough for the bulk material carried by the belt. The carrier has a frame for carrying upright posts. Roller members are interposed between the posts for supporting the belts. The inner ends of the roller members are pivotally mounted on a yoke means secured to the frame and the outer or opposite ends of the rollers are adjustably secured to the adjacent posts so as to permit angular movement of the rollers to change the transverse concave contour of the belt.

While there have been shown, described, and pointed out the fundamental novel features of the invention it is to be understood that various omissions, substitutions, and changes in form of the belt carrier illustrated may be made by those skilled in the art, without departing from the spirit of the invention which is intended to be limited only as indicated by the scope of the following claims.

I claim:
1. A carrier for supporting a portion of a belt comprising:
 (a) a frame member including a cross bar having end sections and an upright support means,
 (b) upright posts having lower end sections and upper end sections, the lower end section of each post being secured to a corresponding end section of the cross bar and the upper end sections of the posts being curved inwardly toward each other, the axis of the radius of curvature of each upper end section intersecting said upright support means,
 (c) first roller means for supporting the midsection of said belt, said first roller means extended substantially parallel to said cross bar and secured for rotation to said upright support means, and
 (d) second roller means for supporting the side sections of said belt, each of said second roller means having shaft means for rotatably supporting said roller means, each of said shaft means having inner ends pivotally mounted on the upright support means at said axes of the radii of curvature of said upper end sections, and means adjustably securing the outer ends of each of said shaft means to the corresponding upper end sections of the posts for varying the angular position of the second roller means relative to the first roller means to change the cross sectional concave contour of the belt.

2. A carrier for supporting a portion of belt comprising:
 (a) a frame member including a cross bar having end sections,
 (b) a pair of upright posts having lower end sections and upper end sections, the lower end section of each post being secured to a corresponding one of the end sections of the cross bar, and the upper end section of each post being curved inwardly of the cross bar and having an axis of the radius of curvature,
 (c) a pair of spaced support members secured to the cross bar and positioned in the upright plane of the posts,
 (d) first roller means for supporting the midsection of said belt, said first roller means extended substantially parallel to said cross bar between said support members and secured for rotation thereto,
 (e) second roller means for supporting the side sections of said belt, each of said second roller means having shaft means for rotatably supporting said roller means, each of said shaft means having inner ends pivotally mounted on the support members at positions coincident with the axes of the radii of curvature of said upper end sections and means adjustably securing the outer ends of each of said shaft means to the corresponding upper end sections of the posts for varying the angular position of the second roller means relative to the first roller means to change the cross sectional concave contour of the belt.

3. A carrier for supporting a portion of a belt comprising:
 (a) a frame member including a cross bar having end sections,
 (b) a pair of upright posts having lower end sections and upper end sections, the lower end sections of each post being secured to a corresponding one of the end sections of the cross bar, and the upper end section of each post being curved inwardly of the cross bar and having an axis of the radius of curvature,
 (c) a support member secured to the midsection of the cross bar and projected upwardly in the plane of the posts,
 (d) first roller means for supporting one half of the belt, said roller means having shaft means for rotatably supporting said roller means, said shaft means having inner and outer ends,
 (e) second roller means for supporting the other half of the belt, said second roller means having shaft means for rotatably supporting said roller means, said last-mentioned shaft means having inner and outer ends,
 (f) first means for pivotally connecting the inner ends of each of the shaft means to the support member at positions coincident with the axes of the radii of curvature of said upper end sections, and
 (g) second means for adjustably securing the outer ends of each of the shaft means to adjacent upright posts for varying the relative angular positions of the first and second roller means to change the transverse concave contour of the belt.

4. A carrier according to claim 3, wherein said second means comprises a collar rigidly secured to the outer end of each of said shaft means, each of said collars being slidably mounted on its corresponding post and being provided with a set screw for lockingly engaging the corresponding posts, and including a reinforcing plate rigidly secured to each of the post lower end sections and the cross bar.

References Cited by the Examiner

UNITED STATES PATENTS

| | | | |
|---|---|---|---|
| 736,905 | 8/1903 | Willson | 198—192 |
| 754,334 | 3/1904 | McCabe | 198—192 |
| 809,227 | 1/1906 | Steckel | 198—192 |
| 1,014,106 | 1/1912 | Wentz | 198—192 |
| 1,530,499 | 3/1925 | Knode | 198—192 |
| 2,427,590 | 9/1947 | Conners | 198—192 |
| 3,033,352 | 5/1962 | Kain | 198—192 |
| 3,088,580 | 5/1963 | Hughes | 198—192 |
| 3,092,240 | 6/1963 | Tyler et al. | 198—192 |
| 3,259,227 | 7/1966 | Steinmetz | 198—192 |

EVON C. BLUNK, *Primary Examiner.*

R. M. WALKER, M. L. AJEMAN, *Assistant Examiners.*